United States Patent
Naffziger et al.

(10) Patent No.: US 6,640,283 B2
(45) Date of Patent: Oct. 28, 2003

(54) APPARATUS FOR CACHE COMPRESSION ENGINE FOR DATA COMPRESSION OF ON-CHIP CACHES TO INCREASE EFFECTIVE CACHE SIZE

(75) Inventors: Samuel Naffziger, Fort Collins, CO (US); Wayne Kever, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/050,736

(22) Filed: Jan. 16, 2002

(65) Prior Publication Data

US 2003/0135694 A1 Jul. 17, 2003

(51) Int. Cl.[7] .............................................. G06F 13/00
(52) U.S. Cl. .................... 711/118; 711/122; 711/128; 711/133
(58) Field of Search ........................ 711/170, 122, 711/128, 129, 133, 135, 136, 144, 145, 202, 118; 710/68; 382/233, 232; 345/521, 501, 507, 509, 555, 557; 714/763, 764; 709/247

(56) References Cited

U.S. PATENT DOCUMENTS

| | | | | | |
|---|---|---|---|---|---|
| 5,652,857 | A | * | 7/1997 | Shimoi et al. | 711/113 |
| 6,032,227 | A | * | 2/2000 | Shaheen et al. | 711/129 |
| 6,128,094 | A | * | 10/2000 | Smith | 358/1.15 |
| 6,145,069 | A | * | 11/2000 | Dye | 711/170 |
| 6,173,381 | B1 | * | 1/2001 | Dye | 711/170 |
| 6,341,325 | B2 | * | 1/2002 | Franaszek et al. | 711/3 |

OTHER PUBLICATIONS

Handy, "The Cache Memory Book", Academic Press, 1993, pp 37–91.*

* cited by examiner

*Primary Examiner*—Hong Kim

(57) ABSTRACT

A compression engine for a cache memory subsystem has a pointer into cache tag memory and cache data memory and an interface coupled to the pointer and capable of being coupled to cache tag memory, and cache data memory. The interface reads tag information and uncompressed data from the cache and writes modified tag information and compressed data to the cache. The compression engine also has compression logic for generating compressed data and generate compression successful information, and tag line update circuitry for generating modified tag information according to the compression successful information and the tag information. Also disclosed is a cache subsystem for a computer system embodying the compression engine, and a method of compressing cache using the compression engine.

4 Claims, 3 Drawing Sheets

APPARATUS FOR CACHE COMPRESSION ENGINE FOR DATA COMPRESSION OF ON-CHIP CACHES TO INCREASE EFFECTIVE CACHE SIZE

FIELD OF THE INVENTION

The present invention relates to the field of cache design for high performance processor integrated circuits. In particular, the invention relates to apparatus for compressing data in a large, upper level, on-chip, cache.

BACKGROUND OF THE INVENTION

Cache memories are high speed memory systems that store a partial copy of the contents of a larger, slower, memory system. The partial copy stored in a cache normally contains those portions of the contents of the larger memory system that have been recently accessed by a processor. Cache memory offers advantage in that many programs access the same or nearby code and data locations repeatedly; execution of instructions is statistically more likely to access recently accessed locations or locations near recently accessed locations than other locations in memory.

Many modern computer system implement a hierarchy of cache memory systems for caching memory data in main memory. Main memory of these systems typically consists of Dynamic Random Access Memory (DRAM). Many common processors, including Intel Pentium-II and Pentium-III circuits, have two levels of cache. There also exist computing systems with three and four levels of cache.

In addition to storage, cache memory systems also have apparatus for identifying those portions of the larger, slower, memory system held in cache, this often takes the form of a cache tag memory.

Cache systems typically have cache tag memory subsystems and cache data memory subsystems. Each cache data memory typically operates on units of data of a predetermined size, known as a cache line. The size of a cache line can be different for each level in a multilevel cache. Cache lines are typically larger than the word or byte size used by the processor and may therefore contain data near recently used locations as well as recently used locations.

In typical cache memory systems, when a memory location at a particular main-memory address is to be read, a cache-line address is derived from part of the main-memory address. A portion of the cache-line address is typically presented to the cache tag memory and to the cache data memory; and a read operation done on both memories.

Cache tag memory typically contains one or more address tag fields. Multiple address tag fields can be, and often are, provided to support multiple "ways" of associativity in the cache. Each address tag field is compared to the remaining bits of the cache-line address to determine whether any part of data read from the cache data memory corresponds to data at the desired main-memory address. If the tag indicates that the desired data is in the cache data memory, that data is presented to the processor and next lower-level cache; if not, then the read operation is passed up to the next higher-level cache. If there is no higher-level cache, the read operation is passed to main memory. N-way, set-associative, caches perform N such comparisons of address tag fields to portions of desired data address simultaneously.

Typically, a tag memory contains status information as well as data information. This status information may include "written" flags that indicate whether information in the cache has been written to but not yet updated in higher-level memory, and "valid" flags indicating that information in the cache is valid.

A cache "hit" occurs whenever a memory access to the cache occurs and the cache system finds, through inspecting its tag memory, that the requested data is present and valid in the cache. A cache "miss" occurs whenever a memory access to the cache occurs and the cache system finds, through inspecting its tag memory, that the requested data is not present and valid in the cache.

When a cache "miss" occurs in a low level cache of a typical multilevel cache system, the main-memory address is passed up to the next level of cache, where it is checked in the higher-level cache tag memory in order to determine if there is a "hit" or a "miss" at that higher level. When a cache "miss" occurs at the top level cache, the reference is typically passed to main memory.

Typically, the number of "ways" of associativity in a set-associative cache tag subsystem is the number of sets of address tags in each line of tag memory, and corresponding sets of comparators. The number of ways of storage is the number of cache lines, or superlines, that can be stored and independently referenced through a single line of cache tag memory. In most caches, the number of ways of associativity is the same as the number of ways of storage. Cache superlines are combinations of multiple cache lines that can be referenced though a single address tag in a line of tag memory.

Writethrough caches are those in which a write operation to data stored in the cache results in an immediate update of data in a higher level of cache or in main memory. Writeback caches are those in which a write operation to data stored in the cache writes data in the cache, but update of data in higher levels of cache or in main memory is delayed. Operation of cache in writeback and writethrough modes is known in the art.

Whenever a cache "miss" occurs at any level of the cache, data fetched from a higher level of cache or main memory is typically stored in the cache's data memory and tag memory is updated to reflect that data is now present. Typically also, other data may have to be evicted to make room for the newly fetched data.

A cache "hit rate" is the ratio of memory references that "hit" in cache to total memory references in the system. It is known that the effective performance of cache-equipped processors can vary dramatically with the cache "hit rate." It is also known that hit rate varies with program characteristics, the size of cache, occurrence of interrupting events, and other factors. In particular, it is known that large effective cache sizes can often offer significantly better hit rates than small cache sizes.

It is therefore advantageous to have a large effective cache size.

Many computer systems embody multiple processors, each having its own cache system for caching main memory references. Typically, processors of such systems may access shared memory. Coherency is required in cache memory of such computer systems. Cache coherency means that each cache in the system "sees" the same memory values. Therefore, if a cache wants to change the contents of a memory location, all other caches in the system having copies of that memory location in its cache must either update or invalidate its contents.

There are many ways data may be compressed that are known in the art. These include run-length algorithms, repeat-based algorithms, and dictionary-based algorithms.

Run-length algorithms are commonly used in facsimile transmission. Software tools for compressing and decompressing data for disk storage and modem data transmission are common in the industry. Software tools for compressing and decompressing disk data when that disk data is cached in main memory are known. Software utilities for compressing and decompressing main memory pages are also known. Most of these utilities and tools make use of a processor of the system to perform both compression and decompression operations, these utilities and tools can consume sufficient processor time to adversely affect system performance.

Many systems provide for caching of disk data in main memory, or other memory of speed similar to that of main memory. For purposes of this patent, a cache for caching disk data in main memory or memory of speed similar to that of main memory is a disk cache; and a cache for caching main memory references as information is fetched by a processor is a processor cache. An on-chip cache is a processor cache located on the same integrated circuit as the processor.

Data stored in cache memory is typically not stored in compressed form. It would be advantageous to do so to attain higher effective cache size, and thus higher hit rates.

Typically, data compression requires more time than decompression because of the time required to count run lengths, detect repeats, and build dictionaries.

U.S. Pat. No. 5,826,054 discloses a processor cache storing a stream of compressed instructions. U.S. Pat. No. 6,216,213 also discloses a processor cache storing a stream of compressed instructions. FIG. 8 of the '054 patent discusses compressing an instruction stream at the time a loadable module is created; it is apparent that a software compression utility executing on a processor is contemplated. The compressed instruction streams of the '054 and '213 patents seem to be decompressed "on the fly" by dedicated hardware as instructions are read from cache into the processor.

It would be advantageous for a processor cache to store at least some data and instructions in compressed form, thereby providing larger effective cache size than available without compression. It would also be advantageous to perform compression and decompression transparently to remaining system components, and to write the cache without delays associated with compressing information.

SUMMARY OF THE INVENTION

A processor cache subsystem for storing instructions and data is capable of storing instruction and data information in both compressed and uncompressed form. The cache subsystem is written first with uncompressed information, a compression engine is provided to scan the cache and replace uncompressed information with compressed information, while releasing any freed space for reuse.

In a particular embodiment, the cache subsystem forms the second level of cache in a system, however it is anticipated that the invention is applicable to third or even fourth level cache subsystems.

Processor references are passed to the cache subsystem upon a miss in first level cache. A portion of each reference address is used to address a tag memory. The tag memory contains at least one, and preferably more, tag address fields, flags for cache management, and data line pointers for each way indicating locations of each cache line of each superline in a cache data memory. In a particular embodiment, the cache is organized as lines of sixty-four bytes in superlines of four lines. The cache data memory is organized as an array of sublines, where two or more sublines form each cache line; in a particular embodiment the cache has sublines of thirty-two bytes. "compressed" flags are associated with each subline in the cache data memory.

Cache hits are determined by comparing tag address fields of the tag memory with additional bits of the reference address. Upon a cache hit, data line pointers from the tag memory are used to locate information in the cache data memory. Compressed information is decompressed prior to transmittal to the first level cache and processor.

In the interest of speed, information retrieved from higher level cache or main memory upon cache misses is written to the cache data memory in uncompressed form, with tag information and pointers updated appropriately. This information is written at a location indicated on an empty-space list, and remains uncompressed until located and compressed by the compression engine.

Cached information is evicted when tags are recycled, or when the empty space list drops below a predetermined threshold.

In another embodiment, cache is addressed through a cache tag memory having sufficient address tags for sixteen-way associativity. Each address tag is associated with a way indicator and flags. Among the flags for each address tag is a compressed flag and a width indicator.

The associated cache data memory has sufficient memory to store twelve ways of uncompressed information. At a location in cache data memory corresponding to each tag memory line is stored a cache line group. The address tags provided in excess of the number required to point to uncompressed data in each cache line group are herein referred to as excess address tags.

The way indicator associated with each address tag indicates where in the cache line group there may be stored a cache line associated with the address tag.

The compression engine periodically reads the cache line group, rewrites it in compressed form if data in the cache line group is compressible, and updates the compressed flags and way indicators of each associated tag line to indicate where in the cache line group each line of data is stored.

In this embodiment, if some or all lines of the cache line group are stored in compressed form, the remaining space in the line group is usable by cache data associated with the excess address tags.

The present invention is expected to be applicable to other associativities and ways of storage. For example, a cache having thirty-two sets of address tags in each line of cache tag memory, and twenty-four ways of storage could be implemented in similar manner.

DETAILED DESCRIPTION OF THE EMBODIMENTS

Figure 1:
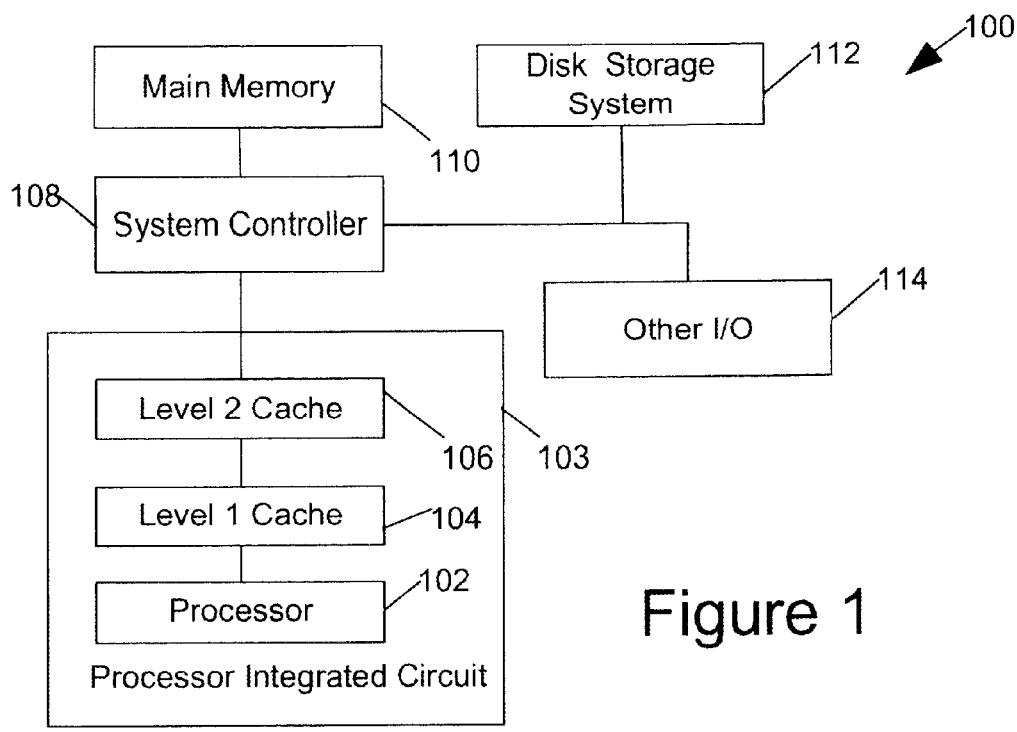
FIG. 1 is a block diagram of a computer system having a two-level cache subsystem.

A computer system 100 (FIG. 1) has a processor 102 on a processor integrated circuit 103, with first level cache 104 as known in the art. First level cache 104 may be a unified instruction/data cache, or may contain separate instruction and data caches. System 100 also has second level cache 106, and a system controller 108. System controller 108 connects the second level cache 106 to main memory 110, as well as to a disk storage system 112 and other I/O devices 114. System controller 108 also provides access to main memory 110 from disk storage system 112.

Figure 2:
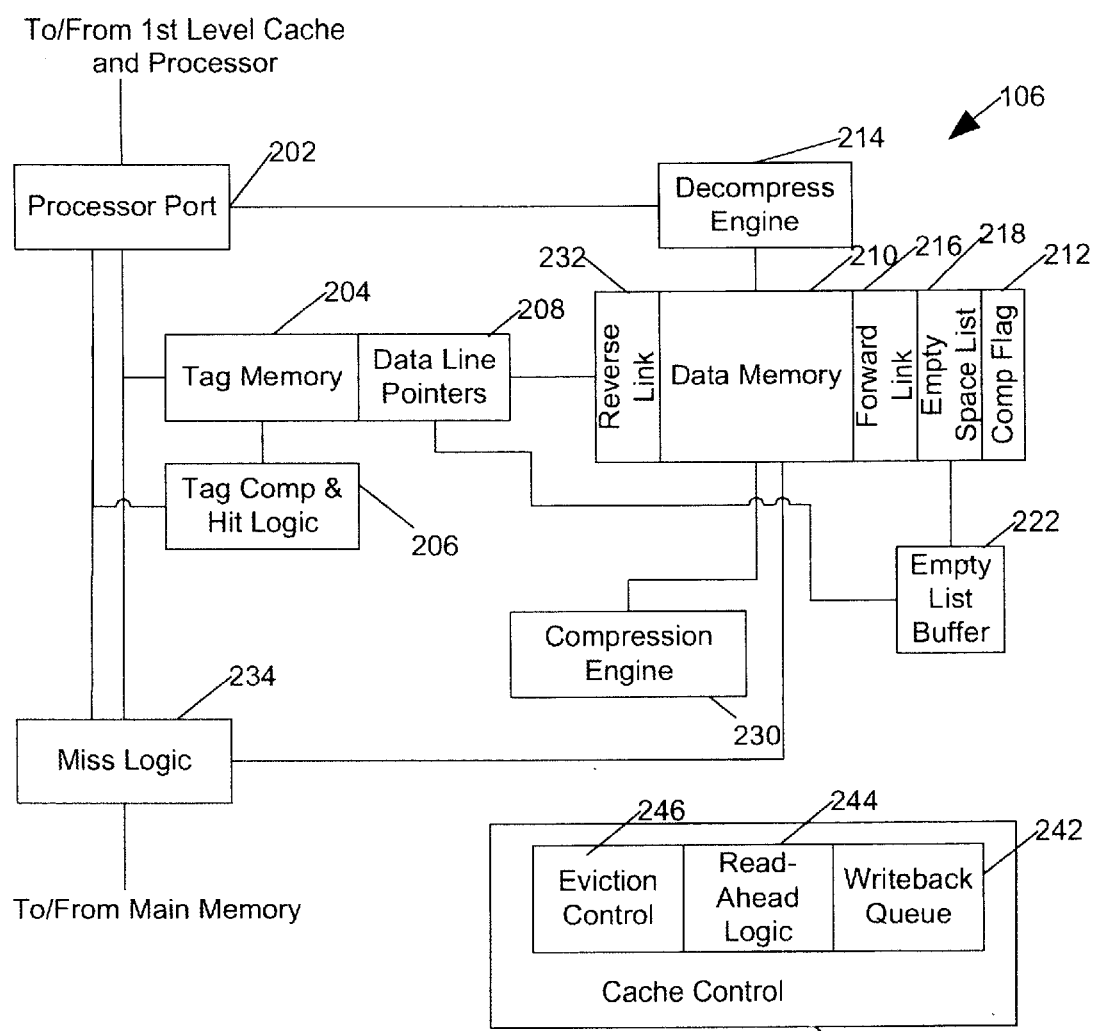
FIG. 2, a block diagram of an upper-level cache subsystem supporting data compression to increase effective cache size.

Second level cache 106 (FIG. 2) is a processor cache. Second level cache 106 receives references that miss in first level cache 104 through processor port 202. These references include a reference address for both read and write operations, and data for write operations. The reference address is divided into four portions, a tag address part, a high address bits part, a line-in-superline part, and a location-in-line line part. The tag address part of the reference address is used to find a corresponding tag line in tag memory 204.

Second level cache 106 is N-way set associative, where N is preferably greater than one, and in a particular embodiment is six. Each tag line in tag memory 204 has a tag address field for each of the N ways of associativity and flags for cache management. The tag address fields of each of the N ways of associativity are compared against the high address bits part of the reference address in tag comparator and hit logic 206; compare results and flags of the tag line are used to determine if there is a hit.

Each tag line in tag memory 204 also has data line pointers 208 for each way indicating locations of each subline of each cache line of each superline in a cache data memory 210. In a particular embodiment, the cache is organized as lines of sixty-four bytes in superlines of four lines totaling two hundred fifty-six bytes each. The cache data memory 210 is organized as an array of sublines, where two or more sublines form each cache line; in the particular embodiment the cache has sublines of thirty-two bytes. "Compressed" flags 212 are associated with each subline in the cache data memory.

When the second level cache 106 receives a read request that scores a hit, a first data line pointer of data line pointers 208 from tag memory is used to locate the first subline of the referenced information in cache data memory 210 and its associated compressed flag 212. If the compressed flag 212 associated with the first subline is set, the subline is expanded into a full cache line by decompression engine 214, the decompressed information is passed to the lower level cache 104 and processor 102. If the compressed flag 212 indicates that the subline contains uncompressed information, a second data line pointer of data line pointers 208 from tag memory is used to locate a second subline of the referenced information, and the first and second sublines are passed to lower level cache 104 and processor 102.

In a first alternative embodiment, a forward link 216 stored with the first subline is used to locate the second subline of the referenced information instead of a second data line pointer of data line pointers 208.

When the second level cache 106 receives a write request that scores a hit, a first data line pointer of data line pointers 208 from tag memory is used to locate the first subline of previously stored information in cache data memory 210 and its associated compressed flag 212. If the compressed flag 212 associated with the first subline indicates that the subline contains uncompressed information, the first subline is overwritten with a first subline of information from first level cache 104 or processor 102. A second subline pointer of subline pointers 208 is then used to locate a subline to be overwritten with a second subline of information from first level cache 104 or processor 102.

In the first alternative embodiment, the forward link 216 stored with the first subline is used to locate the second subline of the referenced information for replacement instead of a second data line pointer of data line pointers 208.

If the compressed flag 212 indicates that the subline contains compressed information, the first subline is overwritten with the first subline of information from lower level cache 104 and processor 102 as previously described, and the compressed flag is cleared to indicate that the line contains uncompressed information. A second subline is removed from an empty space list 218, a second data line pointer of data line pointers 208 is written with a pointer to the second subline, and the second subline written with the second subline of information from first level cache 104 or processor 102.

In the first alternative embodiment, the forward link 216 of the first subline is written with a pointer to the second subline of the written information instead of writing a second data line pointer of data line pointers 208.

Empty space list 218 is maintained as a linked list. In the particular embodiment, this empty space list incorporates forward links stored in each unused subline. In the first alternative embodiment, pointers associated with the empty space list are stored in the forward link 216 fields of each unused subline. This list is initialized at boot time so that all sublines are on the empty space list. In order to avoid congestion at data memory 210, the first several entries of the empty space list are cached in an empty list buffer 222; thereby permitting short bursts of cache activity to occur without having to cycle the data memory 210 to follow the empty space list.

When cycles of cache data memory 210 are not required for reading and writing, compression engine 230 scans cache data memory 210 for sublines having compressed flags 212 indicating presence of uncompressed information. When such sublines are found, compression engine 230 compresses the data and follows reverse links 232 to locate the cache tag associated with the subline. A second data line pointer of data line pointers 208 is obtained from the cache tag to locate the remaining sublines of the entire cache line.

In the first alternative embodiment, the forward links 216 are followed to locate remaining sublines of the entire cache line. In this embodiment, there is no need for reverse links 232.

The compression engine then tries to compress the cache line. If compression results in information that fits in fewer sublines than uncompressed data, compressed data is written to the cache data memory 210, the compressed flag is set, and the sublines released are linked to the empty space list 218.

Cache misses are passed to higher level cache or main memory to fetch new data through miss logic 234 as known in the art. Data is evicted by eviction control 244 as required to make room for storing the new data.

The cache system has cache control logic 240, comprising a writeback queue 242, and eviction control logic 244 as known in the art.

Figure 3:
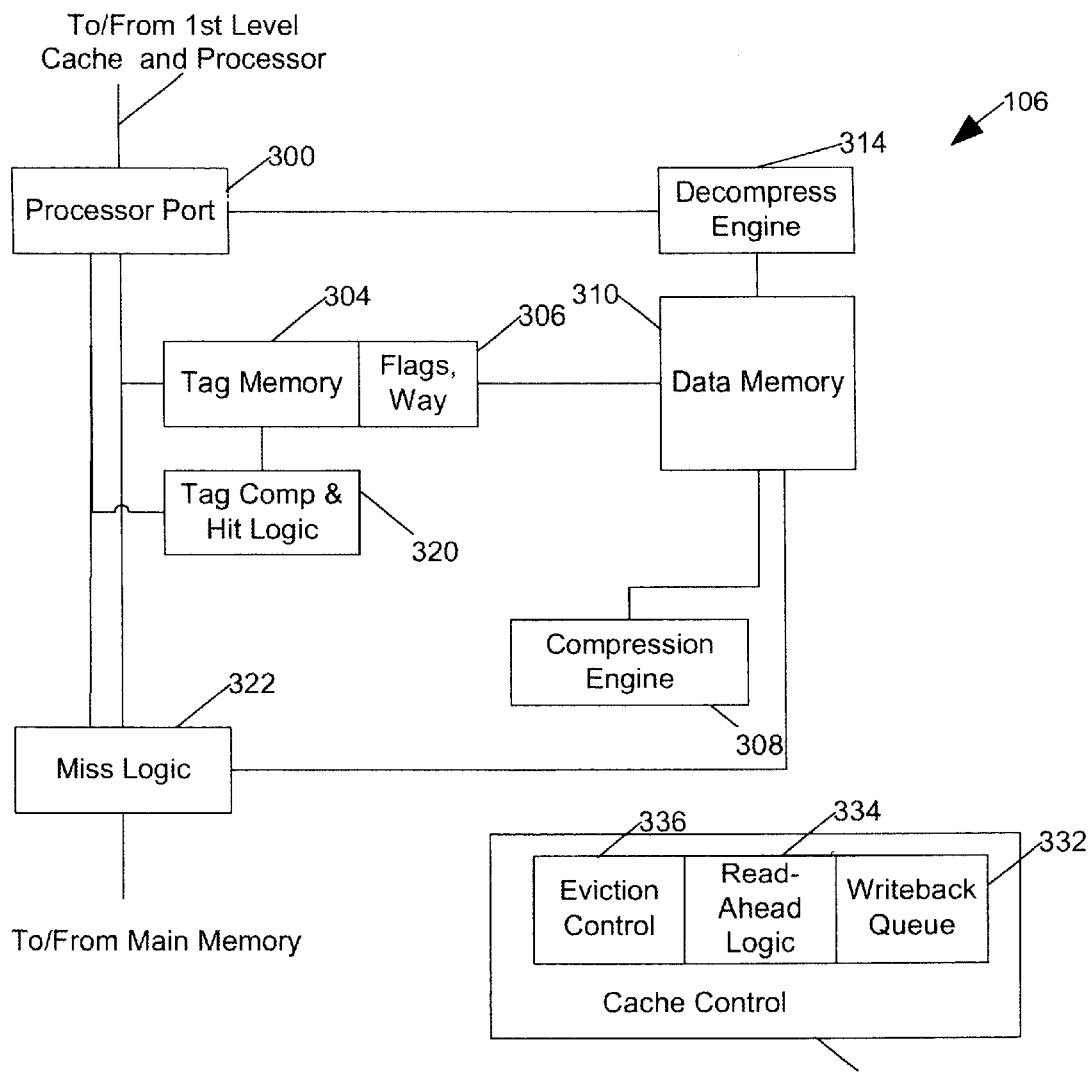
FIG. 3, a block diagram of a second alternative embodiment of the upper level cache subsystem.

In second alternative embodiment, processor references enter the cache subsystem upon misses in lower-level cache through a processor port 300 (FIG. 3). Each reference address is divided into three portions, a tag address part, a high address bits part, and a location-in-line line part. The tag address part of the reference address is used to find a corresponding tag line in tag memory 304.

Figure 4:
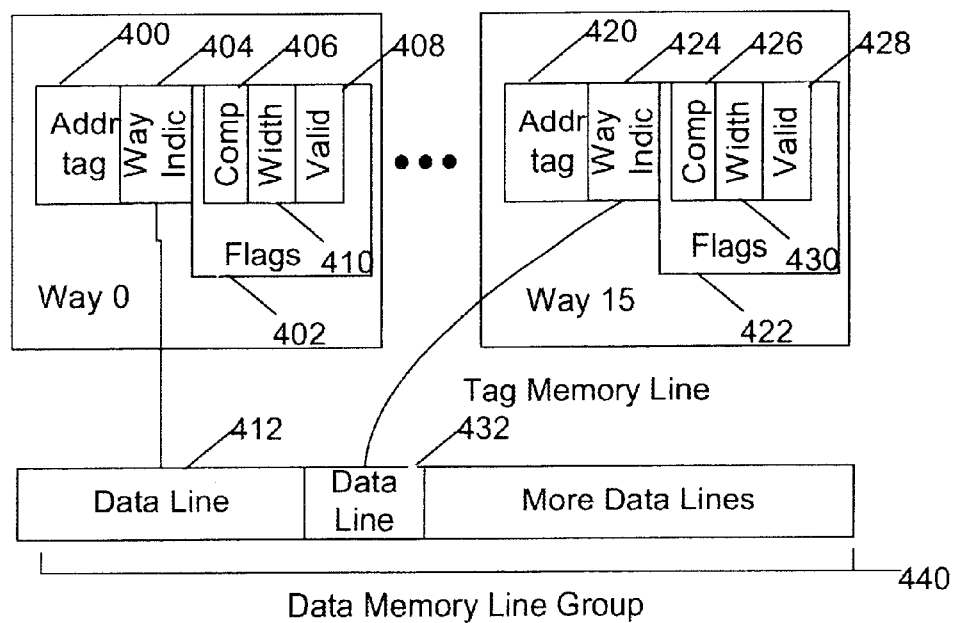
FIG. 4, an illustration of cache data memory organization of the upper level cache subsystem.

Each line of tag memory 304 in this embodiment has sufficient address tags 400 (FIG. 4) for sixteen-way associativity. Each address tag 400 is associated with a way indicator 402 and flags 404. Among the flags 404 for each address tag is a compressed flag 406, a width indicator 408, and a valid flag 410.

The associated cache data memory 306 (FIG. 3) stores twelve ways of uncompressed information. At each a location in cache data memory corresponding to a tag memory line is stored a cache line group. The address tags provided in excess of the number required to point to uncompressed data in each cache line group are herein referred to as excess address tags.

The way indicator 402, 422 (FIG. 4) associated with each address tag indicates where in the cache line group 440 in cache data memory 310 there is stored a cache line associated with the address tag, such as cache lines 412, 432. The width indicator 408, 428 indicates the width of the cache line as an integral number of sublines.

The compression engine 308 (FIG. 3) periodically reads the tag memory 304, with its flags 306, and the cache line group 440 from cache data memory 310. The compression engine 308 compresses the cache line group 440 if it is compressible, then rewrites it in compressed form into cache data memory 310. Compression engine 308 also modifies the width indicator 408, way indicator 404, and compressed flags 404 of tag memory flags 306 to correspond with the compressed cache line group 440.

When data is read from the cache, it is read through a decompression engine 314 and decompressed if the compressed flag 404 indicated the data was compressed.

Cache hits are determined by comparing the high order address field of the reference address with address tags 400 in tag comparator and hit logic 320. Cache misses are passed to higher level cache or main memory through miss logic 322. The cache also has control logic 330, including a writeback queue 332, read-ahead logic 334, and eviction control logic 336 as known in the art. The eviction control logic makes use of additional flags, including recency of use flags, not shown in the figures.

Figure 5:
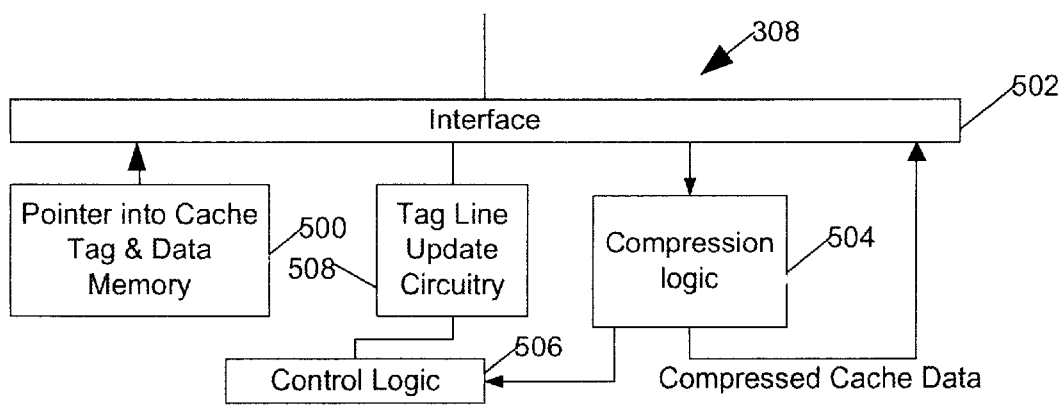
FIG. 5, a block diagram of a compression engine for the upper level cache subsystem.

In this embodiment, compression engine 308 (FIG. 5) has an address pointer 500 that points into cache tag memory 304 and cache data memory 310. In one embodiment this pointer can be implemented as a counter, such that all locations of cache tag memory and cache data memory 310 are scanned. In another embodiment, this pointer is implemented as a queue of recently written locations in cache such that uncompressed data can be quickly located in cache. Compression engine 308 also has an interface 502 for reading and writing cache tag memory 304 and cache data memory 310.

Compression engine 308 reads locations of cache tag memory 304 and cache data memory 310 as indicated by address pointer 500 through interface 502, and passes data from the cache data memory 310 to compression logic 504. Compression logic 504 attempts to apply one or more compression algorithms to the data. In a particular embodiment, compression logic 504 employs a run-length count compression algorithm, a repeated-bit-sequence count compression algorithm, and a common opcode recognition and encoding algorithm; other embodiments may use other compression algorithms. The common opcode recognition and encoding algorithm is capable of recognizing many common instruction codes, including no-operation instructions, and encoding these efficiently. Where compression logic 504 is capable of applying multiple compression algorithms, an algorithm indicator forms part of the compressed data generated by the compression logic.

Since compression algorithms do not always succeed in compressing data, compression logic 504 produces a compression successful indicator as well as compressed data. The compression successful indicator is used by control logic 506 to determine whether compressed data is to be written back into the cache data memory 310 and whether the cache tag memory 304 is to be updated by cache tag update circuitry 508.

In this embodiment, if some or all lines of the cache line group are stored in compressed form, the remaining space in the line group is usable by cache data associated with excess address tags. The provision of excess address tags permits addressing up to a full sixteen ways of cache data if the cache data proves compressible, potentially permitting a three megabyte cache to hold four megabytes of information.

The present invention is expected to be applicable to other associativities and ways of storage. For example, a cache having thirty-two sets of address tags in each line of cache tag memory, and twenty ways of storage could be implemented in similar manner. It is expected that the optimum associativity, number of ways of storage, and cache size will vary with the level of the compressible cache in cache hierarchy, improvements in integrated circuit fabrication technology, and the applications the integrated circuit is intended to run.

The invention is also anticipated to be equally applicable to cache organizations with and without superlines, and to levels of cache other than second level cache. In particular, the invention is anticipated to operable as a third level cache. The invention is also expected to be applicable to writethrough and writeback cache systems.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A cache memory comprising:

a cache tag memory operable with a tag compare and hit logic to determine cache hits;

a cache data memory;

a processor port coupled to permit references to the cache tag memory and the cache data memory by a processor;

a memory port coupled to pass references that miss to a memory selected from the group consisting of higher level cache and main memory;

a compression engine coupled to the cache data memory, the compression engine coupled to read data from the cache data memory, write compressed data into the cache data memory, and update compressed flags stored in a memory selected from the group consisting of cache data memory and cache tag memory;

a decompression engine coupled to receive compressed data from the cache data memory, and provide decompressed data to the processor port; and cache control logic coupled to evict data from the cache memory when necessary to make room for new data fetched over the memory port;

wherein compressed data read from the cache data memory is decompressed before presentation to the memory port whenever data is written through the memory port into the memory selected from the group consisting of higher level cache and main memory, and wherein compressed data read from the cache data memory is decompressed before presentation to the processor port whenever data is read through the processor port.

2. The cache memory of claim 1, wherein the cache data memory is organized as a plurality of independently allocable sublines, and wherein a linked list of available sublines in cache data memory is maintained.

3. The cache memory of claim 1, wherein the cache data memory is organized as a plurality of independently allocable sublines within line groups, where the cache tag memory and comparator and hit logic comprise a plurality of ways of associativity having a greater number of ways of associativity than there are ways of storage provided in each line group in cache data memory.

4. The cache memory of claim 3, wherein a plurality of way of associativity in cache tag memory have associated way indicators that indicate a starting point of an associated cache line in a line group in cache data memory.

* * * * *